UNITED STATES PATENT OFFICE.

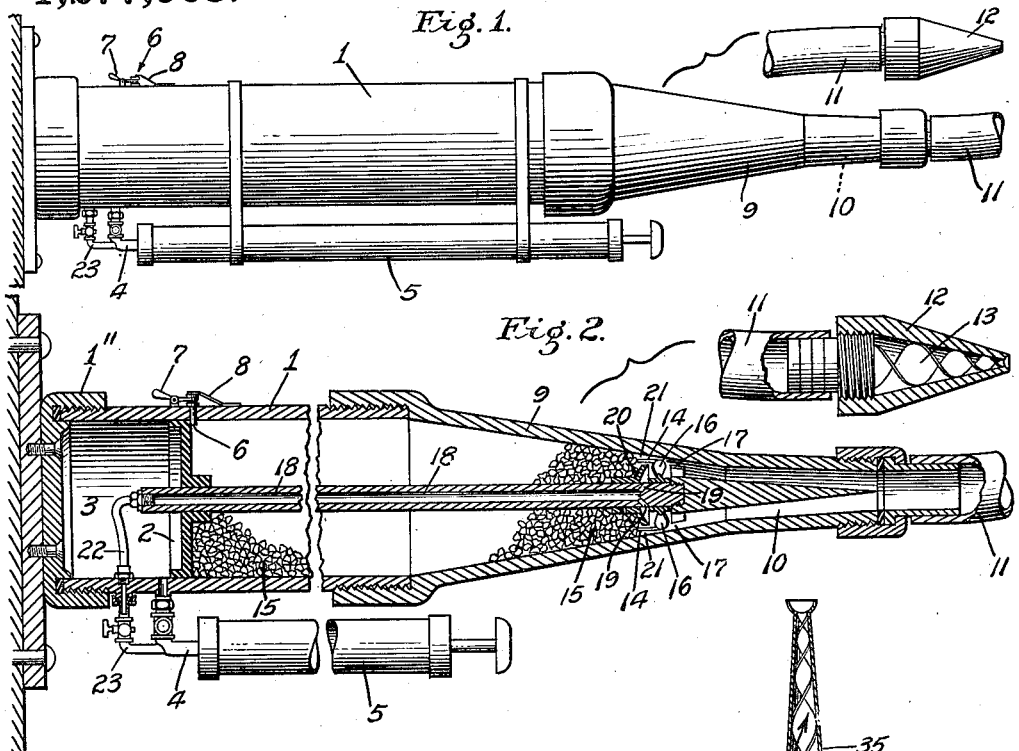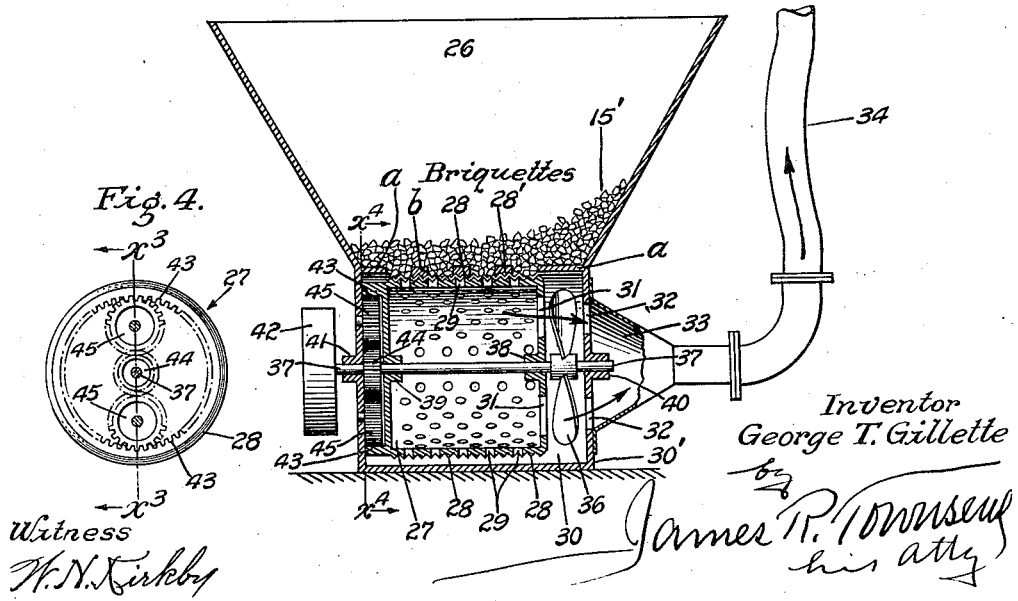

GEORGE T. GILLETTE, OF LOS ANGELES, CALIFORNIA.

FIRE-EXTINGUISHING APPARATUS.

1,277,908.  Specification of Letters Patent.  Patented Sept. 3, 1918.

Original application filed March 20, 1916, Serial No. 85,519. Divided and this application filed October 16, 1916. Serial No. 126,018.

*To all whom it may concern:*

Be it known that I, GEORGE T. GILLETTE, a citizen of the United States, residing at Los Angeles, in the county of Los Angeles and State of California, have invented a new and useful Fire-Extinguishing Apparatus, of which the following is a specification.

This application is a division of my application Serial No. 85519, filed Mar. 20, 1916, for method of and means for extinguishing fires, in which I have claimed a method of extinguishing fires by projecting onto the burning material a stream of the material known as diatomaceous earth or kieselguhr.

An object of this invention is to provide practical means for putting out a fire by the use of said material.

Said diatomaceous earth is non-combustible and non-fusible at the ordinary temperatures of incipient conflagrations, and in fact, is only subject to fusion at a temperature of about 2900° Fahrenheit, and consists of minute silica air cells that are very light so that large bodies of the same are movable by application of comparatively small power.

It is well-known at diatomaceous earth plants that such earth will adhere in considerable quantities to the surfaces of ceilings, walls, pillars and posts of the buildings in which such earth is ground for commercial purposes.

I have discovered that diatomaceous earth when projected onto a burning object by the power of an air current will adhere to such object, thus excluding oxygen and reducing the temperature so that combustion is immediately stopped.

Diatomaceous earth as is well known is of very low specific gravity and an object of this invention is to make the use of such earth practical on both large and small scales for extinguishing fires and preventing conflagrations.

An object of the invention is to make provision whereby diatomaceous earth may be conveniently and practically employed by hand machines, and also by fire engines to extinguish fires.

The invention, therefore contemplates employing certain apparatus by which the use of diatomaceous earth is made effective and whereby sufficient quantities of such earth may be kept conveniently at hand ready for use as required.

It is understood that the material which may be used for this purpose is variously known as diatomaceous earth, infusorial earth, kieselguhr, tripoli, etc. The same occurs in nature in various parts of the world and the material which I have put to this use is found in large deposits in California.

In its natural state the diatomaceous earth is moist, and after being taken from the natural deposits, it is usually dried and ground to a fine dust or flour.

It is preferable in carrying out this method of fire extinguishment not to handle this material as a fine flour, because it is bulky and will blow away in the open air.

This invention includes means for disintegrating or pulverizing briquets formed of this dust or flour and immediately projecting the powder onto the fire. By this means it is made possible to practically fight fires with the diatomaceous earth for the reason that it is thus made possible to supply the necessary bulk of diatomaceous flour for the purpose in hand.

The briqueting of the diatomaceous earth may be effected by any suitable well known briqueting machines now in use.

Illustration of such a machine is not deemed necessary.

The diatomaceous earth may be used when brought from the natural state to powdered form by any means either with or without intermediate briqueting.

The accompanying drawings illustrate two forms of means by which the diatomaceous earth may be disintegrated or powdered and applied to the extinguishing of fires. A partial charge of briqueted diatomaceous earth is shown.

Figure 1 is an external view of hand apparatus illustrating one mode of operation particularly designed for extinguishing incipient fires, the same being intended to take the place of the usual hand-operated portable chemical fire extinguishers.

Fig. 2 is a broken axial section of the apparatus shown in Fig. 1.

Fig. 3 is a fragmental section viewed from line $x^3$—$x^3$, Fig. 4, showing apparatus designed for extinguishing fires on a larger scale. This form is adapted to take the place of fire engines of the present type.

Fig. 4 is a sectional elevation on line $x^4$—$x^4$, Fig. 3, omitting the hopper construction.

In Figs. 2 and 3 only a portion of the briquet charges are shown and it is to be understood that in Fig. 2 the diatomaceous earth chamber is filled with briquets or pellets of compressed diatomaceous earth.

Referring first to Figs. 1 and 2, the container comprises a virtually horizontal barrel or shell 1 having a nozzle connected to one end for the purpose of allowing the contents of the barrel to be expelled through the nozzle. Power is applied by some suitable means to move a head 2 along the barrel advancing the diatomaceous earth for this purpose, and with this object in view, air pressure is supplied to a chamber 3 behind the head 2. The means shown for supplying such air pressure is a valved pipe 4 leading from the air compressor 5 which is shown as an ordinary automobile air pump. A latch 6 is shown mounted on the shell 1, said latch being operated by a handle 7 and normally held in latching position by a spring 8.

In its natural state the diatomaceous earth is moist and in order to reduce the same to the preferred condition for putting this invention into practice it is dried and ground to an impalpable dust.

In putting this invention into practice the powdered diatomaceous earth is preferably briqueted to a desired size, being thereby compressed into a more compact form than when in its powdered state. The briquets may be of any approved dimensions as from the size of a pea to that of a walnut or larger, and the briquets may be of any approved form as spheroidal, cylindrical, etc. These briquets are designed to be stored awaiting occasion for use on fires, and when the fire occurs they are pulverized and the earth dust thus obtained is projected onto the fire. The operation of projecting the powdered material on the fire may be variously conducted, and various means may be employed for this purpose.

The consolidated diatomaceous earth may be protected from moisture by some suitable water-proof coating. A water-proof coating of substance such as casein may serve the purpose.

The nozzle in Figs. 1 and 2 is shown as comprising a main body 9 screwed onto the barrel 1 and provided with an annular outlet 10 which is connected by any suitable means as the hose 11 with a nozzle piece 12 that is preferably provided with a spiral arrangement which may be in the form of a spiral deflector as indicated at 13.

A grinding device, shown as comprising teeth 14, is provided at an appropriate point to be operated by suitable means to comminute the briquet material 15. It is necessary that said teeth be forcibly operated whenever it is desired to project a stream of a diatomaceous earth dust from the nozzle. With the object of operating the teeth 14 a fan 16 is provided in the throat 17 of the nozzle, and means are provided for directing compressed air upon the blades of the fan or propeller 16. This means is shown as consisting of a pipe 18 having outlets 19 opening behind a deflector 20 around which is an annular passage-way 21 in which the teeth 14 fixed to the fan, revolve on a virtually horizontal axis and during their rotation describe a virtually cylindrical outline. The pipe 18 is connected by a tube 22 with a valved air pipe 23 that is connected with the air compressor 5.

When the air pressure is turned on through the connections 22, 23 the propeller rotates, thus driving the grinding apparatus to pulverize the diatomaceous material that passes through the passage 21 and to deliver the same through the annular outlet 10 in a finely divided state; the dust being carried along through the nozzle 12 and ejected in a fine stream upon the substance that is afire.

The chamber may be charged with diatomaceous material by simply unscrewing the chamber 1 from its base 1″ and detaching the connection 22 and removing the floating plunger or piston head 2, then inserting the charge and then replacing the parts as before.

In Figs. 3 and 4 the briquet material 15′ is of larger dimensions and is contained in the hopper 26 which is mounted above a revoluble cylindrical drum 27 that has annularly arranged staggered teeth 28 which, together with complementary teeth 28′ arranged on the under side of the hopper floor $a$, constitute the grinding means in the present instance and during their rotation also describe a virtually cylindrical outline. Said hopper floor $a$ is provided with apertures $b$ through which the briquets may drop onto the drum, the periphery of which has appropriately arranged perforations 29. The teeth 28, 28′ grind the diatomaceous material 15′ into an impalpable dust that passes on through the perforations 29 and into the interior of the drum, said drum opening through end ports 31 into the surrounding chamber 30 formed by the outer impervious case 30′. The case 30′ opens through ports 32 into a conductor 33 that is connected by any suitable means with a hose 34 that is supplied with a nozzle 35 appropriately constructed to discharge the dust. The drum is revolubly mounted in the chamber 30, the drum hubs 38 and 39 being adapted to freely turn upon the shaft 37 that is supported in a virtually horizontal position in the case bearings 40, 41, and blower means in the form of a fan 36 is fixed to the shaft at the discharge end of the drum, said fan being operated by power through any suitable means as the pulley 42. The drum 27 has an internal gear 43 that is driven by speed-reducing gearing 44, 45 so that the exhaust fan 36 will be driven at a much higher speed than the drum, although simultaneously therewith, to carry the earth dust out and eject the same through the nozzle 35.

It is understood that various kinds of air may be used including non-combustible gases, but it is practicable to use a stream of compressed atmospheric air for this purpose as the dust may be supplied to such stream in such quantities as to smother the fire. A phenomenon of the operation is that any draft that the fire makes tends to carry the dust to the fire and by making the cloud or stream of dust sufficiently great to load the air and adhere to the burning surfaces, the fire is smothered.

The rotation of the grinding means on a virtually horizontal axis, and the virtually cylindrical outline described by the grinding means during its rotation, materially aid in triturating the diatomaceous earth evenly and thoroughly, and the efficiency of the fire-extinguishing apparatus is greatly increased thereby, as the even comminution facilitates an even distribution of the minute particles of earth before they reach the fire.

I claim:—

1. In a device of the character described, a container for diatomaceous earth, in combination with means rotatable on a virtually horizontal axis and adapted to describe a virtually cylindrical outline during its rotation to pulverize the earth and air blast means rotatable on said axis to discharge the product in powdered form.

2. A device of the character described comprising a container for diatomaceous earth, grinding means rotatable on a virtually horizontal axis and adapted to describe a virtually cylindrical outline during its rotation to pulverize the diatomaceous earth, and air blast means rotatable on said axis to discharge the pulverized material.

3. A device of the character described comprising in combination a container for diatomaceous earth, grinding means rotatable on a virtually horizontal axis and adapted to describe a virtually cylindrical outline during its rotation to pulverize the diatomaceous earth, and means rotatable on said axis for supplying an air current to discharge the pulverized material.

4. A device of the class described comprising a hopper for containing diatomaceous earth, grinding means rotatably mounted on a virtually horizontal axis and adapted to describe a virtually cylindrical outline during its rotation and located below said hopper to pulverize the diatomaceous earth, a discharge nozzle, and blower means operatively connected with said grinding means and being rotatable on said axis to expel the pulverized material through said nozzle.

5. A device of the class described comprising a hopper for containing diatomaceous earth, grinding means rotatable on a virtually horizontal axis and adapted to describe a virtually cylindrical outline during its rotation to pulverize the diatomaceous earth, a discharge nozzle, and blower means operatively connected with said grinding means and being rotatable on said axis to expel the pulverized material through said nozzle.

6. A device of the class described comprising a hopper for containing diatomaceous earth, a case below said hopper and having a chamber therein, grinding means rotatably mounted on a virtually horizontal axis and adapted to describe a virtually cylindrical outline during its rotation in said chamber to pulverize the diatomaceous earth, a nozzle in communication with said chamber, and a blower operatively connected with the grinding means and being rotatable on said axis to expel the pulverized material from said chamber and through the nozzle.

7. A device of the class described comprising a hopper for containing diatomaceous earth, a case below said hopper and provided with a discharge opening, a cylindrical grinding drum mounted on a virtually horizontal axis in said case to pulverize the diatomaceous earth, a fan rotatable on said axis in said case at the discharge opening thereof to expel the pulverized material, and means to turn the drum and the fan simultaneously.

8. A device of the class described comprising a hopper for containing diatomaceous earth, a case below said hopper and provided with a discharge opening, a cylindrical grinding drum mounted on a virtually horizontal axis in said case to pulverize the diatomaceous earth, a fan rotatable on said axis in said case at the discharge opening thereto to expel the pulverized material, and means to turn the drum at a lower speed than the fan, although simultaneously therewith.

9. A device of the class described comprising a hopper for containing diatomaceous earth, a case below said hopper and provided with a discharge opening, a shaft supported in a virtually horizontal position in said case, a cylindrical grinding drum mounted on said shaft and adapted to freely turn thereon, gear means connecting the drum with said shaft to turn the drum to pulverize the diatomaceous earth, and a fan fixed to said shaft and positioned at the discharge opening to expel the pulverized material.

10. A device of the class described comprising a hopper for containing diatomaceous earth, a case below said hopper and provided with a discharge opening, a shaft supported in a virtually horizontal position in said case, a cylindrical grinding drum mounted on said shaft and adapted to freely turn thereon, gear means connecting the drum with said shaft to turn the drum at a lower speed than said shaft to pulverize the diatomaceous earth, and a fan fixed to said shaft and positioned at the discharge opening to expel the pulverized material.

In testimony whereof, I have hereunto set my hand at Los Angeles, California, this 9th day of October, 1916.

GEORGE T. GILLETTE.

Witness:
JAMES R. TOWNSEND.